United States Patent [19]
Johnson et al.

[11] 4,453,122
[45] Jun. 5, 1984

[54] ELECTRICAL BALANCING CONTROL FOR THREE-PHASE LOADS

[76] Inventors: Ewing A. Johnson, 99 Sterling Rd.; Paul E. Straight, 1222 Greenbriar Rd., both of Fairmont, W. Va. 26554

[21] Appl. No.: 312,665

[22] Filed: Oct. 19, 1981

[51] Int. Cl.³ .............................................. G05F 5/00
[52] U.S. Cl. ................................. 323/300; 318/806; 318/808; 318/809
[58] Field of Search ............... 318/599, 723, 798, 806, 318/808, 809; 323/217, 283, 300, 322

[56] References Cited

U.S. PATENT DOCUMENTS

| | | | |
|---|---|---|---|
| 3,958,172 | 5/1976 | Beck | 323/300 |
| 4,078,191 | 3/1978 | Morters et al. | 318/809 X |
| 4,078,393 | 3/1978 | Wills | 318/809 X |
| 4,122,384 | 10/1978 | Suzuki | 323/300 X |
| 4,289,948 | 9/1981 | Jurek et al. | 323/300 X |
| 4,346,339 | 8/1982 | Lewandowski | 323/300 X |

*Primary Examiner*—William M. Shoop
*Attorney, Agent, or Firm*—Carothers & Carothers

[57] ABSTRACT

A voltage or current balancing control for supplying a balanced three-phase alternating current supply to an electrical three-phase load. Three controllable full wave semiconductor gates respectively feed one phase of a three-phase alternating current supply to the electrical load. The semiconductor gates are adapted to controllably adjust the voltage or current of a phase of the supply in accordance with a gate control signal to be applied thereto. A comparator circuit is connected to receive the three-phase alternating current supply and is adapted to compare either the voltage or current characteristics, or both (power) of each phase to determine an unbalanced condition therebetween which is analyzed by an analog or digital computer, which accordingly supplies gate control signals to the semiconductor gates respectively to independently control them in accordance with the unbalanced condition to adjust the voltage and/or current of all three phases of the supply to an equal or balanced condition.

5 Claims, 1 Drawing Figure

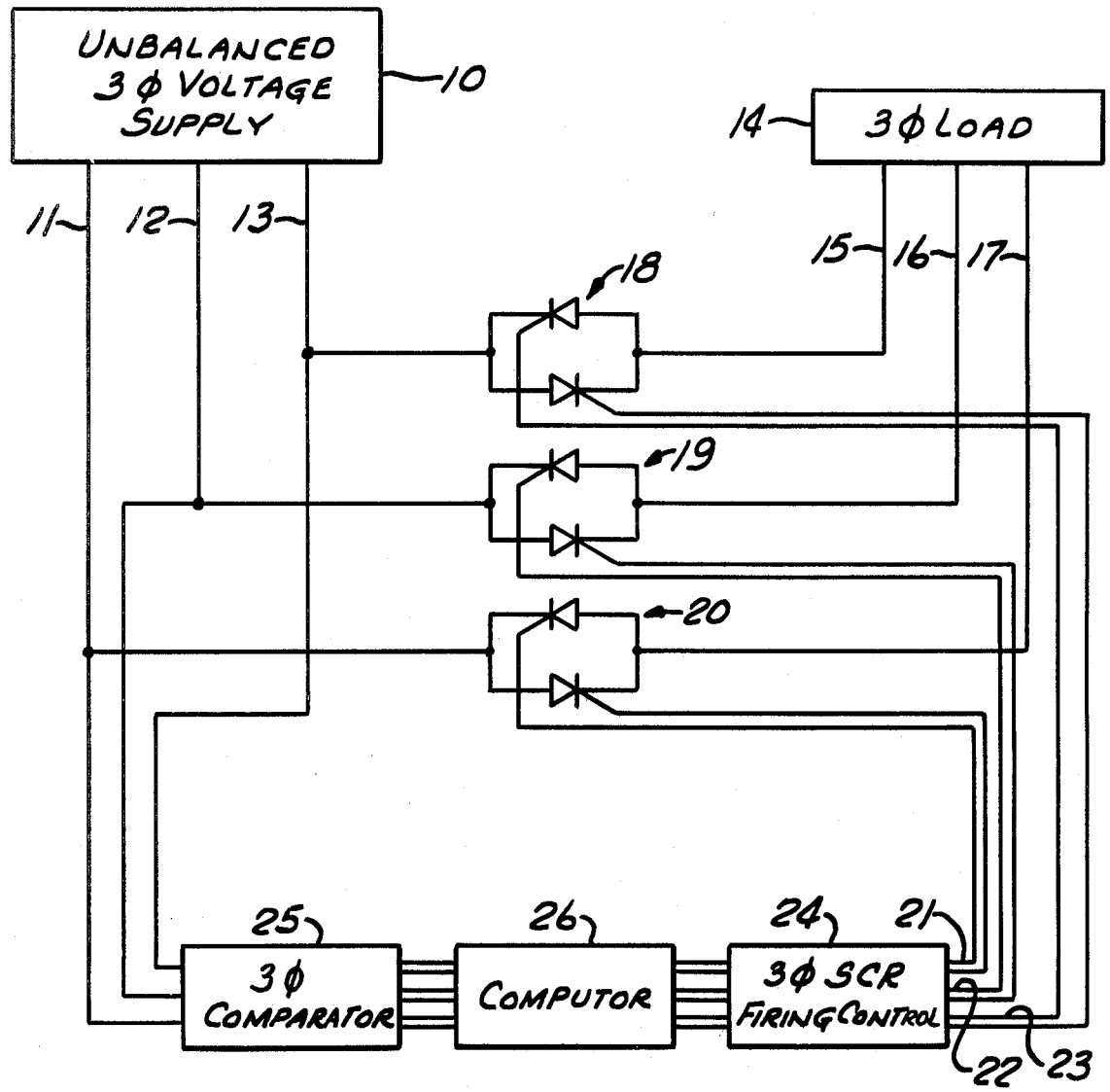

ELECTRICAL BALANCING CONTROL FOR THREE-PHASE LOADS

BACKGROUND OF THE INVENTION

The present invention relates generally to three-phase alternating current supplies and more particularly to controls for correction of unbalanced voltages and/or currents supplied to three-phase electrical loads.

The single most costly factor in terms of wasted energy and loss of equipment life for three-phase motors is unbalanced phase voltages. Efficient use of materials and space in motor design has made the relationship between overheating and aging much more critical. The non-organic insulating materials which bring so many benefits to today's motors in terms of dielectric strength, higher operation temperatures, and more horsepower per pound, also bring with them some limitations. Cotton and varnish in the large frame motors of previous years would absorb thermal and mechanical abuse to a degree not permitted with glass fiber and silicon resins used in the motors of today. Less weight per horsepower is significant in relation to protection, in that thermal time constants are shorter, hence the heating rate from abnormal conditions have increased thus reducing thermal overload capability in the modern motor.

The life of a modern motor is not necessarily less than its predecessor if temperatures are kept within specified limits, but its rated temperature is already high and the same percent thermal overload in the modern motor as compared to the older motor results in a greater numerical temperature increase in the more modern motor.

The largest contributor to overheating in three-phase motors is unbalance of the voltages in a three-phase motor system. The temperature rise of a modern three-phase motor with an average voltage unbalance between phases of 10% means or dictates that a 200% rise in temperature will occur. This may be readily seen by reference to NEMA Standard MGI-14.33. When this factor is coupled with standard tests conducted on motor insulation, as documented in AIEE Specification 5101EEE 117, it reveals that a 10% increase in insulation temperature above design temperature causes motor insulation life to be halved.

Not only is the temperature rise caused by unbalanced phase voltages detrimental to motor life, it is also a basic cause of wasted energy given off in the form of heat, which is particularly critical in the present days of energy shortage.

Electric utilities, per industry standards, are only required to maintain voltages within plus or minus 10%. State and local standards may further limit the tolerance to plus or minus 5%, but there is no industry standard on voltage balance of a three-phase system other than the single-phase standards applied to each individual phase. Voltage unbalance of 5% to 10% or greater seems to be quite permissible, but fortunately, most utilities maintain a balance considerably better, but not to any controlled degree. A voltage unbalance of only 3.5% will cause a temperature rise of 25%.

Also, even though the voltage unbalance may be minimal at the point of origin or supply from the electric utility, voltage unbalance can greatly increase at remote locations of supply due to many different loads applied to the three-phase supply intermediate the point of original transmission and the ultimate remotely located load on the extreme ends of the transmission line.

Also, current and power (voltage x current) deviations in different phases of a three-phase supply connected to a load also can cause energy loss and heat fatigue, shorting the life of the three-phase load and wasting expensive energy.

SUMMARY OF THE INVENTION

It is a principal object of the present invention to provide a means for balancing of voltages, currents or power in a three-phase alternating current supply to a three-phase load. The present invention is discussed primarily in relationship to the balancing of voltages between phases, however, the same principles also apply to the balancing of currents, or power (voltage x current), between phases at locations remote from the original point of transmission of the three-phase alternating current supply. As previously explained, the situation is particularly critical in connection with voltage balancing for three-phase inductive loads.

The control of the present invention samples the three-phase alternating voltage (or current or power) variation between phases on a supply voltage and regulates it to a uniform voltage (or current or power) on each phase. Means are provided to evaluate any unbalanced phase voltage, which information is utilized by a power control means to adjust the voltage (or current or power) on each phase causing the power control means to equalize the voltage on each phase. The control of the present invention has particular novelty in balancing phase voltage supplied to three-phase inductive loads, such as motors, thereby eliminating an increase in thermal losses.

The balancing control for supplying a balanced three-phase alternating current supply to the electrical load of the present invention comprises three controllable semiconductor gate means, which could be three back-to-back sets of thyristors, silicon-controlled rectifiers, power transistors or the like, which respectively feed one phase of a three-phase alternating current supply to an electrical load. The semiconductor gate means is adapted to controllably adjust an electrical characteristic, more ordinarily voltage, and also current, of a phase of the supply in accordance with a gate control signal applied to the gate means. A comparator circuit is also connected to receive or sample the three-phase alternating current supply, and is adapted to compare these like electrical characteristics of each phase, such as voltage, or current, or power, to determine an unbalanced condition therebetween. An analog or digital computer is provided to receive this information from the comparator circuit and is adapted to supply gate control signals to the gate means respectively to independently control the gate means in accordance with the unbalance condition and to adjust the voltage or current electrical characteristics of the three phases of the three-phase supply to a balanced condition.

BRIEF DESCRIPTION OF THE DRAWING

Other objects and advantages appear in the following description and claims.

The accompanying drawing shows, for the purpose of exemplification without limiting the invention or the claims thereto, certain practical embodiments illustrating the principles of this invention wherein the FIGURE is a schematic diagram illustrating one embodiment of the balancing control of the present invention.

DETAILED DESCRIPTION OF THE PREFERRED EMBODIMENT

With reference to the drawing, the balancing control of the present invention utilizes solid state semiconductor devices such as thyristors or silicon controlled rectifiers, power transistors or the like, as the regulating medium. The control of the present invention is described in conjunction with the use of SCRs since they are presently the more popular method of semiconductor voltage regulation.

As indicated in the drawing, the balanced or unbalanced three-phase voltage supply indicated at 10 supplies a three-phase alternating current to supply transmission lines 11, 12 and 13. This three-phase alternating current supply is ultimately fed to the three-phase load 14, which in this instance is an inductive load in the form of a three-phase motor, via conductors 15, 16 and 17 through full wave or back-to-back SCR sets 18, 19 and 20, respectively.

Each of the SCRs within these three sets only conducts when its anode is positive with respect to the cathode and a gate signal is applied, and two SCRs in each phase line form an inverse parallel connection that produces full wave control. The controlled output of the SCR sets 18, 19 and 20 is accomplished by varying the timing of the gate pulses supplied to each pair of the SCRs in each of the three-phase power lines via the gate pulse line sets 21, 22 and 23, respectively on the three-phase SCR firing control circuit 24.

The controlled output of the SCR sets 18, 19 and 20 is accomplished by varying the timing of the gate pulses applied to each pair of SCRs in each of the three-phase power lines. Phase angle firing is accomplished by three-phase SCR firing control circuit 24 to turn on the SCRs during each consecutive half cycle. The turn-on point is varied within the half cycle time frame to achieve time control. If the gate pulse is applied early in the half cycle, the output is high. If the gate pulse is applied late in the cycle, only a small increment of the waveform is passed through, and therefore the output is low. The point at which the pulse is applied is continuously varied across the half cycle.

A voltage phase unbalance detector in the form of three-phase voltage comparator 25 in combination with computer 26 are utilized to automatically adjust the point at which the pulse is applied to the respective SCR set 18, 19 and 20, which in turn varies the voltage at the motor terminals to motor 14. Three-phase voltage comparator 25 samples the unbalanced three-phase voltage supply in lines 11, 12 and 13 and compares them and computer integrator 26 accordingly commands three-phase SCR firing control 24 to correspondingly control the respective SCR sets 18, 19 and 20 to now provide a balanced three-phase voltage to the load 14. Each of the three-phase motor lines 15, 16 and 17 contains one set of these back-to-back SCRs 18, 19 and 20 and the phase unbalance detector senses voltage unbalance of each of these three phases and then adjusts the proper set of the phase angle of the SCRs to obtain a balanced voltage.

Obviously, the voltage at the motor terminals for motor 14 can only be decreased from that voltage available on the incoming three-phase power lines 11, 12 and 13, but the thermal effect of a 3% to 10% low voltage on the motor terminals is insignificant as compared to a 3% to 10% unbalanced voltage, as previously described. If the phase voltage on one line is less than that of the other two, then the three-phase voltage comparator in combination with the computer will control the three-phase SCR firing control 24 to adjust the firing pulse, and resultantly the firing angle, of the SCRs in the remaining two phase lines so that their voltages are lowered to equal that of the first or lowest phase voltage.

One pertinent application of the control of the present application is in combination with solid-state motor starters using SCRs connected in the three-phase lines to the motor terminals. With the advent of high current, high voltage SCRs, solid state semiconductor type motor starters have become practical. Since the current inrush (starting current) varies directly with the applied voltage, the current can be reduced by applying reduced voltage initially and gradually bringing the applied voltage up to its rated value. A solid state starter of this type is relatively simple since it only requires controlled rectifier in each of the primary lines supplying the motor. In each phase, the controlled rectifiers are gated for a portion of each half cycle of power line frequency, thus reducing the voltage impressed on the motor to that part of the cycle during which the controlled rectifiers are turned on. A smooth acceleration results with this type of starter because the voltage drop across the controlled rectifier is initially the full line voltage (0 voltage at the motor terminals). As the gating of the controlled rectifiers is varied, the voltage drop across the controlled rectifiers becomes less and the voltage at the motor terminals rises.

Thus, the balancing control of the present invention can be novelly and effectively added in series onto the aforedescribed solid state semiconductor type motor starters to detect that the three line voltages (or currents or power factors) are not equal and then to adjust the timing pulse of any one or more set of the SCRs 18, 19 and 20 of the three power lines 11, 12 and 13 to reduce the voltage (or current) in that phase or phases, sufficiently to make all three voltages (or currents or power factors) of the motor terminals equal or to provide balanced voltage (or current or power).

As an alternative, such a solid state starter an be positioned in parallel with the depicted control of the present invention to supply the inductive load. In such a set up, the solid state starter would gradually increase the voltage at the motor terminals of motor 14 from 0 to 100% of the incoming three-phase line voltage and then once the starting time period (usually 10-40 seconds) is completed, three-phase voltage adjuster of the present invention can be automatically turned on or cut in by a relay (not shown), at which time, its input unbalanced voltage comparator will compare the three incoming voltages and the computer 26 in combination with the three-phase SCR firing control 24 will then alter the firing pulses on the proper set of SCRs 18, 19 and 20 to reduce the voltage on the particular incoming AC line 11, 12 or 13, until all three voltages (or currents or power factors) are equal and balanced. The lowest of the three voltages is used as the reference, and the other two voltages are reduced until they equal it.

The three-phase voltage comparator 25, computer 26, and three-phase SCR firing control circuit 24 are all in and of themselves, or per se, known circuits to electrical engineers and can be readily understood and constructed by those of ordinary skill in the art by conventional integrated circuit chips found in the market.

There are a vast number of conventional ways to implement the computer 26 and comparator 25, and there are many basic packages readily available on the market which could be used to supply these two blocks 25 and 26. For example, voltage current or power transducers to convert these parameters to a control signal are readily available from Westinghouse Electric, General Electric, or such speciality houses as F.W. Bell Inc., or Ohio Semitronics, Inc. The devices for controlling the three phase pulses are again readily available from a variety of companies such as Westinghouse, General Electric, Vectrol or a variety of specialty houses such as Firing Circuits Inc., or Enerpro, Inc.

The comparators are again available from a variety of standard manufacturers and can be found in both analog and digital packages such as the comparator sold under the trademark National 4-Bit Magnitude Comparator MM74C85 or National's LM139 Quad Comparator. In this regard, reference may be made to the National Linear Application Handbook at page AN74-5.

As a typical example, three of the Ohio Semitronics, Inc. voltage transducers (the particular model number being selected depending upon the current, voltage and KVA ratings required) can be used on each phase of the three phase supply to measure phase voltage and provide a d.c. control signal proportional to phase voltage. The same also applies with regard to current and watt. These three d.c. signals can be compared in the aforementioned quad comparator manufactured by National under Model No. LM139 against an adjustable reference voltage (equal voltage for each phase-balanced condition) and provide an output control signal if the control signal deviates from the reference signal. Operation of a basic comparator is standard to the art. These three control signals from the comparator circuits are used to operate the single phase SCR power controllers on each of the three phases of the three phase supply voltage. Normally, the engineer of ordinary skill would usually design all these circuits into one single package instead of using all of the individual packages available.

A typical standard power control using the Ohio Semitronics, Inc. transducers is available from Temp, Inc., as well as from the aforementioned suppliers and others, to control the power to one phase or all three phases and has a built in comparator to compare the power as measured by the power transducer to a built in reference set point voltage. This may be seen from literature available from Temp, Inc., for example in their bulletin Series 124 option 8A. Model numbers listed on this bulletin show various models available depending upon current, voltage and KVA conditions.

The computation of power, RMS current of RMS voltage irrespective of the chopped wave form is performed in the Ohio Semitronics, Inc. transducer.

We claim:

1. A balancing control for supplying a balanced three-phase alternating current supply to an electrical load, comprising three controllable semiconductor gate means respectively feeding one phase of a three-phase alternating current supply to an electrical load, said semiconductor gate means adapted to controllably adjust an electrical characteristic of a phase of said supply in accordance with a gate control signal to be applied thereto, comparator circuit means also connected to receive said three-phase alternating current supply and adapted to compare a like electrical characteristic of each phase to determine an unbalanced condition therebetween, computer means connected to said comparator circuit means and adapted to supply gate control signals to said gate means respectively to independently control said gate means in accordance with the unbalanced condition to adjust the like electrical characteristics of the three phases of said supply to a balanced condition.

2. The alternating three-phase balancing control of claim 1, wherein said like electrical characteristic of each phase being controlled is voltage.

3. The alternating three-phase balancing control of claim 2, wherein the three-phase load is an inductive load.

4. The alternating three-phase balancing control of claim 3, wherein said controllable semiconductor gate means consists of three full wave back-to-back sets of silicon controlled rectifiers having their gates controlled by a three-phase silicon controlled rectifier firing control circuit in turn controlled by said computer means.

5. A method of balancing like electrical characteristics of a three-phase alternating current supply to a three-phase electrical load comprising the steps of, inserting controllable semiconductor gate means in each of three three-phase supply lines feeding the load from the supply, comparing a selected electrical characteristic such as voltage or current for each phase of the three-phase alternating current supply to detect unbalance, and generating respective electrical control signals in accordance with the unbalance detected and respectively controlling said gate means therewith to balance.

* * * * *